No. 674,608. Patented May 21, 1901.
J. J. HESER.
ANIMAL POKE.
(Application filed Apr. 6, 1901.)
(No Model.)
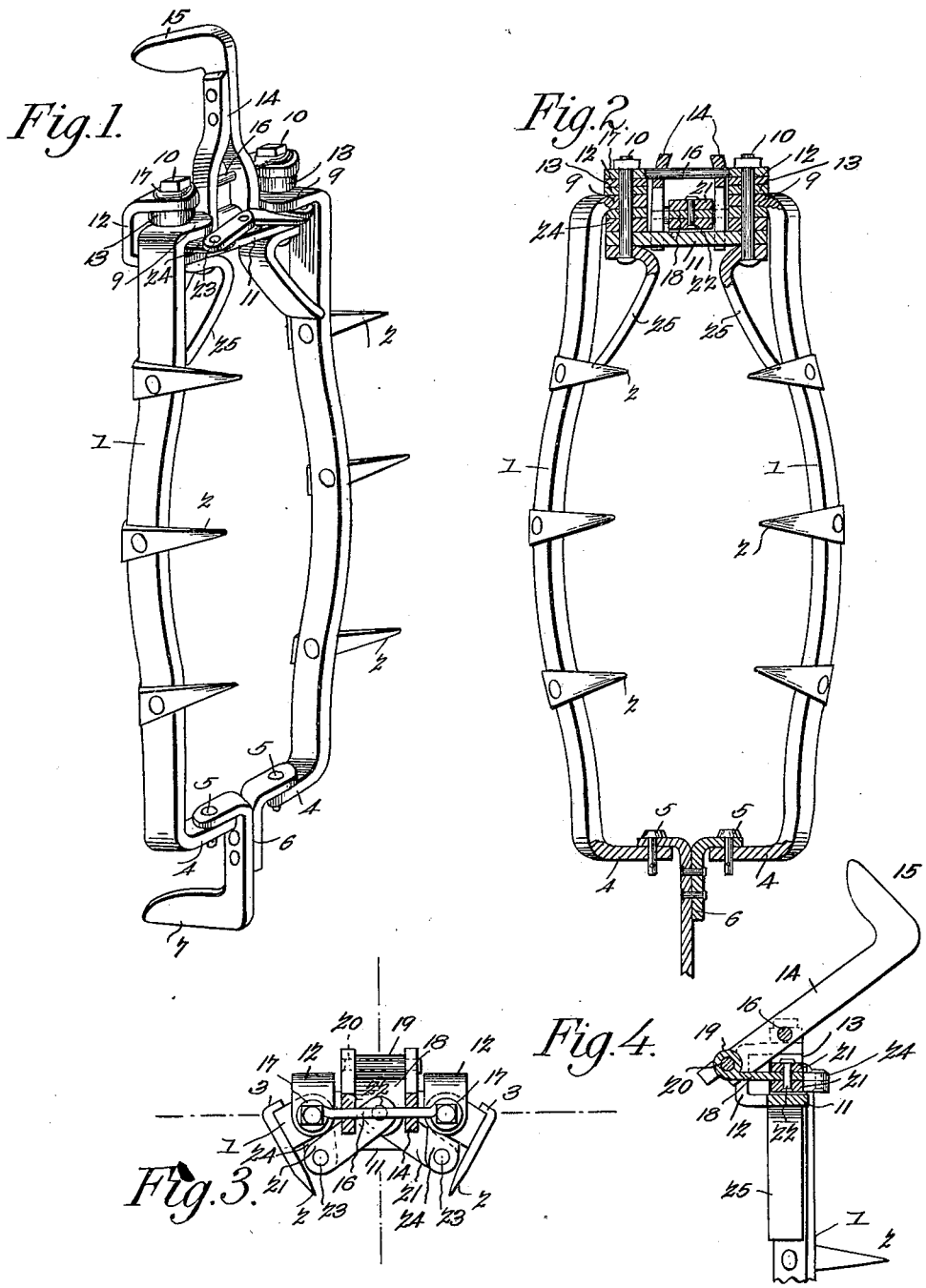
Witnesses:
J. S. Bowen
John J. Heser Inventor
by C. A. Snow & Co.
Attorneys

UNITED STATES PATENT OFFICE.

JOHN J. HESER, OF UTICA, NEBRASKA.

ANIMAL-POKE.

SPECIFICATION forming part of Letters Patent No. 674,608, dated May 21, 1901.

Application filed April 6, 1901. Serial No. 54,730. (No model.)

*To all whom it may concern:*

Be it known that I, JOHN J. HESER, a citizen of the United States, residing at Utica, in the county of Seward and State of Nebraska, have invented a new and useful Animal-Poke, of which the following is a specification.

The invention relates to improvements in animal-pokes.

One object of the present invention is to improve the construction of animal-pokes and to provide a simple and comparatively inexpensive one which will be strong and durable and which will effectually prevent an animal from breaking through a fence or the like.
A further object of the invention is to provide an animal-poke adapted to be placed on the neck of an animal similar to a yoke and capable when it comes in contact with a fence-wire or other object of automatically prodding or pricking the neck and shoulders of the animal, whereby the same will be effectually deterred from moving forward through such obstruction.

The invention consists in the construction and novel combination and arrangement of parts hereinafter fully described, illustrated in the accompanying drawings, and pointed out in the claims hereto appended.

In the drawings, Figure 1 is a perspective view of an animal-poke constructed in accordance with this invention. Fig. 2 is a vertical sectional view. Fig. 3 is a horizontal sectional view of the upper portion of the animal-poke. Fig. 4 is a vertical sectional view taken at right angles to Fig. 2.

Like numerals of reference designate corresponding parts in all the figures of the drawings.

1 1 designate similar outwardly-bowed hinged sides spaced apart to form a yoke or frame adapted to be arranged on the neck of an animal similar to an ordinary yoke, and the said sides or bars 1 are provided with pointed projections or spurs 2, adapted to prick or prod the neck and shoulders of an animal when the sides or bars are turned inward, as hereinafter explained. The spurs or projections, which are preferably riveted or otherwise secured to the outer faces of the side bars, are provided at their inner or front ends with inwardly-extending flanges 3, arranged at the front edges of the sides or bars and adapted to prevent the spurs or projections from turning on the rivets or fastening devices which secure them to the sides or bars. The lower terminals 4 of the sides 1 are bent inward and are pivoted by vertical pins or pintles 5 to laterally-extending arms 6 of a substantially L-shaped hook 7, having its engaging portion 8 at the bottom and adapted to catch on a fence-wire or the like for the purpose hereinafter explained. The laterally-extending arms, which are arranged at the top of the shank of the lower L-shaped hook, connect the lower ends of the sides, and the pivots or pintles formed by the pins 5 hinge the sides and permit the same to swing inward and outward to carry the spurs or projections into or out of engagement with the animal.

The upper terminals 9 of the sides or bars 1 are bent inward and perforated for the reception of vertical pivots 10, which also pass through perforations of a connecting top piece 11, consisting of a transverse portion and upwardly-extending approximately L-shaped arms 12, extending inward over the upper ends of the sides 1 and spaced therefrom by suitable washers or sleeves 13. The upwardly-extending L-shaped arms of the connecting top piece are spaced apart to receive a lever 14, forming the shank of a hook 15 and mounted on a transverse pivot 16, secured at its ends to the arms 12, as clearly illustrated in Figs. 1 and 2 of the drawings. The pivot, which may be secured to the arms 12 in any suitable manner, is shown in the drawings as provided with end eyes 17 for the reception of the vertical pivots or pintles 10, which preferably consist of bolts.

The lever 14, which constitutes the shank of the upper hook, is forked, and the opening between the sides receives a longitudinally-removable approximately horizontally-disposed link 18, provided at its front end with an eye 19 for a pin or other suitable fastening device 20 and pivoted at its rear end to a pair of links 21 by a suitable fastening device 22. The links extend laterally and rearwardly from the link 18 and are pivoted by rivets or other suitable fastening devices 23, with arms 24 extending outward and rearward from the upper terminals of the sides 1. By this construction the arms 24 of the sides are oscillated when the upper hook comes in contact with a fence-wire or other object and is forced backward by the forward movement of the animal. When the upper portion of the upper hook is swung backward, as illustrated in Fig. 4 of the accompanying drawings, the central link 18 is drawn forward and the arms 24 are swung inward, thereby turning the sides 1 and carrying the spurs or projections into engagement with the animal. The more force exerted by the animal in attempting to force its way through a fence the greater will be the inward movement of the sides and the consequent prodding or pricking action of the spurs or projections.

The device is provided at the top of the yoke with inclined downwardly-diverging plates 25, adapted to conform generally to the configuration of the neck of an animal to permit the animal-poke to be worn without material inconvenience. The upper terminals of the plates 25 are bent outward and perforated for the reception of the lower ends of the upper and lower pintles.

It will be seen that the device is exceedingly simple and inexpensive in its construction, that it is positive and reliable in its operation, and that it is capable of effectually preventing an animal from forcing its way through a fence or breaking down or otherwise injuring a structure of any kind. It will also be apparent that the upper and lower hooks are particularly adapted for catching the wires of a fence and that the upper hook will be swung rearward and will turn the spurs or projections inward with a force proportionate to the force exerted by the animal in attempting to force its way forward.

The animal-poke may be made of any size and the hooks may be varied in length, and I desire it to be understood that these and similar changes for adapting the device to the animal on which it is to be used may be resorted to without departing from the spirit or sacrificing any of the advantages of the invention.

What I claim is—

1. An animal-poke comprising the sides hinged at their upper and lower ends and provided with spurs or projections, an upper lever, and connections between the lever and the sides, whereby when the lever is forced backward the sides will be turned inward, substantially as described.

2. An animal-poke comprising the sides hinged at their upper and lower ends and forming a yoke or frame adapted to be arranged on the neck of an animal, and an upper lever connected with and adapted to turn the sides inward and outward, substantially as described.

3. An animal-poke comprising a lower hook, the sides hinged to the lower hook and adapted to be turned inward and outward, a connecting-piece arranged at the top of the sides and having the same hinged to it, and a lever forming an upper hook and fulcrumed on the connecting-piece and connected with the sides, substantially as described.

4. An animal-poke comprising a lower hook having laterally-extending arms, the movable sides hinged at their lower ends to the arms of the lower hook and provided at their upper ends with arms, a connecting-piece arranged at the upper ends of the sides and having the same hinged to it, and a lever fulcrumed on the connecting-piece and connected with the arms of the sides, substantially as described.

5. An animal-poke comprising a top piece, the sides hinged to the top piece and adapted to be turned inward and outward and provided with arms, a lever fulcrumed on the top piece, and links connecting the lever with the arms of the sides, substantially as described.

6. An animal-poke comprising a top piece having upwardly-extending arms, sides hinged to the arms and adapted to be turned inward and outward, a lever fulcrumed between the arms of the top piece, and links connecting the lever with the sides, substantially as described.

7. An animal-poke comprising a top piece provided with upwardly-extending approximately L-shaped arms, a transverse pivot supported by the arms, a lever fulcrumed on the pivot and arranged between the arms, a longitudinal link pivoted to the lever, and the laterally-extending links connecting the said link with the sides, substantially as described.

8. An animal-poke comprising a top piece having upwardly-extending arms, vertical pivots supported by the arms, sides hinged to the top piece by the pivots and provided with horizontal arms, a lever fulcrumed between the upwardly-extending arms of the top piece and having a forked portion, a longitudinal link pivoted in the forked portion of the lever, laterally-extending links connecting the said link with the arms of the sides, and means for connecting the lower ends of the sides, substantially as described.

9. An animal-poke comprising a top piece, vertical pivots mounted thereon, sides hinged to the top piece by the vertical pivots, a lever fulcrumed on the top piece and connected with the sides, and the downwardly-diverging plates secured to the top piece and adapted to rest upon the neck of an animal, substantially as described.

In testimony that I claim the foregoing as my own I have hereto affixed my signature in the presence of two witnesses.

JOHN J. HESER.

Witnesses:
JOHN ORTH,
WILLIAM LEIF.